United States Patent
Cantor

(10) Patent No.: US 6,520,541 B1
(45) Date of Patent: Feb. 18, 2003

(54) VEHICLE SAFETY SEAT SYSTEM

(75) Inventor: Alan E. Cantor, Ivyland, PA (US)

(73) Assignee: Penn State Research Foundation, University Park, PA (US)

( * ) Notice: Subject to any disclaimer, the term of this patent is extended or adjusted under 35 U.S.C. 154(b) by 0 days.

(21) Appl. No.: 09/622,628

(22) PCT Filed: Dec. 22, 1998

(86) PCT No.: PCT/US98/27318

§ 371 (c)(1), (2), (4) Date: Aug. 18, 2000

(87) PCT Pub. No.: WO00/36951

PCT Pub. Date: Jun. 29, 2000

(51) Int. Cl.$^7$ ................................. B60R 22/48
(52) U.S. Cl. ..................... 280/801.1; 297/452.27; 297/452.55
(58) Field of Search .................. 280/806, 801.1; 180/282; 297/452.27, 452.55

(56) References Cited

U.S. PATENT DOCUMENTS

| | | | | |
|---|---|---|---|---|
| 3,770,318 A | * | 11/1973 | Fenton | 297/452.47 |
| 3,833,259 A | * | 9/1974 | Pershing | 280/806 |
| 4,065,181 A | * | 12/1977 | Gunlock et al. | 297/440.22 |
| 4,521,057 A | * | 6/1985 | Varterasian et al. | 248/562 |
| 4,561,695 A | * | 12/1985 | MacCready | 297/452.55 |
| 5,269,590 A | * | 12/1993 | Carlli | 280/806 |
| 5,423,598 A | * | 6/1995 | Lane, Jr. et al. | 280/806 |
| 5,490,706 A | | 2/1996 | Totani | |
| 5,492,368 A | * | 2/1996 | Pywell et al. | 280/806 |
| 5,553,924 A | | 9/1996 | Cantor et al. | |
| 5,571,253 A | * | 11/1996 | Blackburn et al. | 280/806 |
| 5,902,014 A | * | 5/1999 | Dinkel et al. | 297/180.1 |
| 5,934,748 A | * | 8/1999 | Faust et al. | 297/180.1 |
| 6,151,601 A | * | 12/2000 | Cantor et al. | 280/806 |
| 6,189,966 B1 | * | 2/2001 | Faust et al. | 297/180.13 |
| 6,123,510 A1 | * | 4/2001 | Suyama | 280/806 |

FOREIGN PATENT DOCUMENTS

| | | | | |
|---|---|---|---|---|
| DE | 3729392 | * | 12/1988 | 280/806 |
| DE | 3841687 | * | 6/1990 | 280/806 |
| JP | 404071948 | * | 3/1992 | 280/806 |

* cited by examiner

*Primary Examiner*—Paul N. Dickson
*Assistant Examiner*—Toan C To
(74) *Attorney, Agent, or Firm*—Reed Smith LLP

(57) ABSTRACT

A vehicle safety seat system for protecting an occupant of the vehicle safety seat from injury. The safety seat system includes a ramped metal seat bottom having a ramp angle that prevents sub-marining of an occupant during a frontal impact. A first foam layer is disposed immediately over the ramped metal seat bottom and supported by the ramped metal seat bottom. The first foam layer has a rate sensitive compression characteristic. A second foam layer is disposed over the first foam layer. The second foam layer imparts comfort to the occupant during operation of the vehicle.

6 Claims, 3 Drawing Sheets

VEHICLE SAFETY SEAT SYSTEM

BACKGROUND OF THE INVENTION

The present invention relates generally to vehicle safety equipment, and, in particular, to safety equipment protecting occupants of a vehicle from injury during a wheels-first crash.

The purpose of occupant restraint systems in motor vehicles is the protection of occupants to increase their survival probability during crash impact of the vehicles. Occupant restraint systems perform three basic functions in order to achieve this: the prevention of occupant ejection from the vehicle, the prevention or minimization of the effects of secondary collisions such as impacts with interior vehicular structures and the control of the crash forces applied to the occupant. Known occupant restraint devices such as three-point lap and shoulder harnesses which perform these functions have been widely researched and improved over the years, thereby significantly increasing automotive safety.

However, attention to the seating portion of automotive restraint systems has not been as extensive. One concern in the area of the seating portion of these systems is that the design of many contemporary automotive seat bottoms have compliant characteristics during vertical loading, +Gz, wherein +Gz is understood to be the upward spinal loading for human occupants of the seats of the type which may occur when an automobile becomes airborne and then lands wheels first. Compliant seating characteristics tend to produce excessive occupant displacements during impulsive loading thereby exposing the occupant to structural strike hazards and offering little management of the crash impact energy.

Hodgson, V. R., Vissner, H. R. and Patrick, I. M., "Response of the Seated Human Cadaver to Acceleration and Jerk With and Without Seat Cushions", The Journal of the Human Factors Society, 1963, disclosed a study with human cadavers during vertical loading. The study concluded that the dynamic load factor, or dynamic overshoot, was increased by all types of cushions used in the tests. The report also concluded that the use of a soft cushion which bottoms during an impulsive force causes more overshoot than the use of no cushion at all. However, soft cushions continue to be used because of perceived occupant comfort in prior art automotive seat cushion technology.

Military technologists have expended considerable effort researching the problem of +Gz exposure, both in the ejection seat and crash-resistant seat areas. This +Gz force vector is an important factor in many occupant survival considerations in military vehicles. For example, helicopter occupants experience significant +Gz acceleration during crashes and hard landings. Ejection seat occupants also experience significant +Gz accelerations as the seat is rapidly propelled from the aircraft.

Military experiments on ejection and helicopter seats have demonstrated that a contoured non-compressible seat pan covered with a rate-dependent foam cushion provides reasonable occupant response by minimizing displacement of the occupant under load. Displacement controlling seat bottoms define occupant kinematics in a predictable manner. This enables designers to identify potential structural strike hazards and to protect the seat occupant from them. This type of seat bottom prevents occupant response from exhibiting excessive dynamic overshoot but may lack the comfort typically required in automobile applications.

U.S. Pat. No. 5,553,924 to Cantor, et al. disclosed a Vehicle Safety Seat System where a metal seat bottom is covered with a comfort foam layer. A rate-dependent foam layer is then disposed above the comfort foam layer. Although this design provided injury protection for the occupant, the design lacked the comfort required in automobile applications.

Human tolerance to +Gz loading may be expressed in terms of both amplitude and time duration. This loading data is commonly reported as Eiband Curves. Using this method of characterization a level of 23 G over approximately a time duration of 5.5 milliseconds has been identified as a critical transition point for the threshold injury region for the human spine. See, for example, Eiband, A. Martin, 1959, Human Tolerance to Rapidly Applied Accelerations: A Summary of the Literature, National Aeronautics and Space Administration, Washington. Subsequent investigation by military researchers in the development of ejection seat designs essentially substantiated the data published by Eiband.

However, it is generally accepted that these tolerance values are based on healthy young males who are ideally positioned with the mid-axillary line of the spine parallel to the acceleration vector. Researchers agree that departure from ideal prepositioning or ideal physiology of the seated occupant tends to lower the ability of the spine to tolerate +Gz loading without serious injury.

Consequently, occupant characteristics such as age, sex, bone strength, and initial position all in influence occupant response to impulsive acceleration loading. These factors may increase the likelihood of serious spinal injury even at force levels substantially below the 23 G level set forth by Eiband. As a result of these variables researchers have attempted to define a risk regime of +Gz exposures where extreme caution must be taken to avoid spinal injuries.

Standard military protocol for testing human subjects to +Gz generally permits initial exposure at a safe level of 6 G for training and indoctrination purposes. Acceleration is then gradually increased in 1 G to 2 G increments, using the 8 G through 10 G levels to study kinematic motions. Higher levels, for example, 12 G and beyond, define the risk range. In this protocol, exposure to this risk range is undertaken only after careful analysis of occupant response to accelerations in the safe range The close relationship between the safe range and the risk range on the +Gz axis has necessitated careful control of dynamic overshoot within military seating systems in order to prevent avoidable and unnecessary increase of exposure in the risk range. This principle is directly applicable to all vehicles that experience a +Gz acceleration.

Automobile seat designers typically use several different seat bottom design approaches which are very different from the military approach. Some automobile seats contain varied thicknesses of padding material integrated with an array of springs and positioned over an open space within a seat cushion frame. Other designs use thick layers of similar padding material mounted within a rigid seat bottom structure. Still other designs use a hybrid of cushion foams and structures in forming the automotive seat.

It is well known in the field of vehicle safety to provide seat belt restraints for occupants of automobile seats. It is also well known to provide pretensioner devices for eliminating slack in seat belt restraint in order to ideally position occupants including coupling the occupants of the seats with the seat cushions. Conventional pretensioners operate by using well known sensing devices which sense a crash using crash sensors.

It is an object of the present invention to provide a vehicle safety seat system that protects an occupant from upward force along the spinal column during a wheels-first crash and affords the occupant substantial comfort during normal operation of the vehicle.

SUMMARY OF THE INVENTION

The present invention comprises an automobile safety seat system which has been designed to provide both protection from upward force along the spinal column of an occupant of the seat and comfort to the occupant. This kind of force that the seat protects against is that which is applied to an occupant in a wheels-first automobile crash such as a crash into a ditch. The seat bottom of the safety seat system includes an angled metal seat bottom.

The seat bottom of the present invention provides an angled metal undersurface which is covered with rate-dependent energy absorbing foam. The angled metal undersurface includes a definitive anti-submarining ramp for reaction of the buttocks during certain types of collisions. The ramp and underseat construction should be tailored and tuned to each individual automobile station in which they are used. A starting region for such a point design may be the following characteristics:—The overall slope angle from front to rear should be approximately 25 to 35 degrees. Where the front to rear dimension of the seat is approximately eighteen inches, a starting location for the ramp may be approximately nine inches from the rear of the seat bottom.

The angled metal seat understructure is then covered with a two-inch layer of environmentally covered energy absorbing foam. The energy absorbing foam layer is a rate sensitive foam which is easily compressible when force is applied to it slowly and substantially rigid when force is applied to it quickly, for example, during a hard impact. This layer provides the advantageous force transmission properties of a more rigid seating surface. A comfort pad of a thickness of about one inch is placed on top of the rate sensitive foam. The comfort pad is either open or closed cell and is characterized as a flexible resilient foam, not qualifying as rate dependent. A layer of upholstery is then placed between the comfort pad and the occupant in order to protect the comfort pad from wear and provide a uniform seated surface.

The seat belts of the automobile seat are attached to the seat bottom as close as practical to the intersection between the occupant compressed seat back and the occupant compressed seat bottom in order to control buttocks angulation during unloading events and to aid in keeping the buttocks coupled to the seat. In order for the seat bottom to provide effective dynamic overshoot control in the preferred embodiment of the invention, the seat belt includes a pretensioner. The pretensioner which activates prior to a wheels-first landing applies preimpact tension to the seat belt in order to prevent slack in the lap region and thereby further improve occupant coupling with the seat cushion. The combination of the belt mounting and the pretensioner helps the buttocks of the occupant remain applied to the seat bottom cushion prior to and during the landing of the wheels in the event of a wheel-first crash. The mounting location of the seat belt controls angulation of the belt and ensures that a snug belt maintains the buttocks against the seat cushion when properly angulated. It also helps to maintain the seat belt on the pelvis of the occupant during a variety of other types of crashes.

In the present invention, the pretensioner activates when a vehicle off-ground sensor indicates that the vehicle containing the inventive seat system is airborne.

The vehicle off-ground sensor operates by detecting unweighting of the wheels. Triggering is buffered to prevent inadvertent actuation of the pretensioner during maintenance and lifting of the automobile.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings.

DETAILED DESCRIPTION OF PREFERRED EMBODIMENTS

Figure 1:
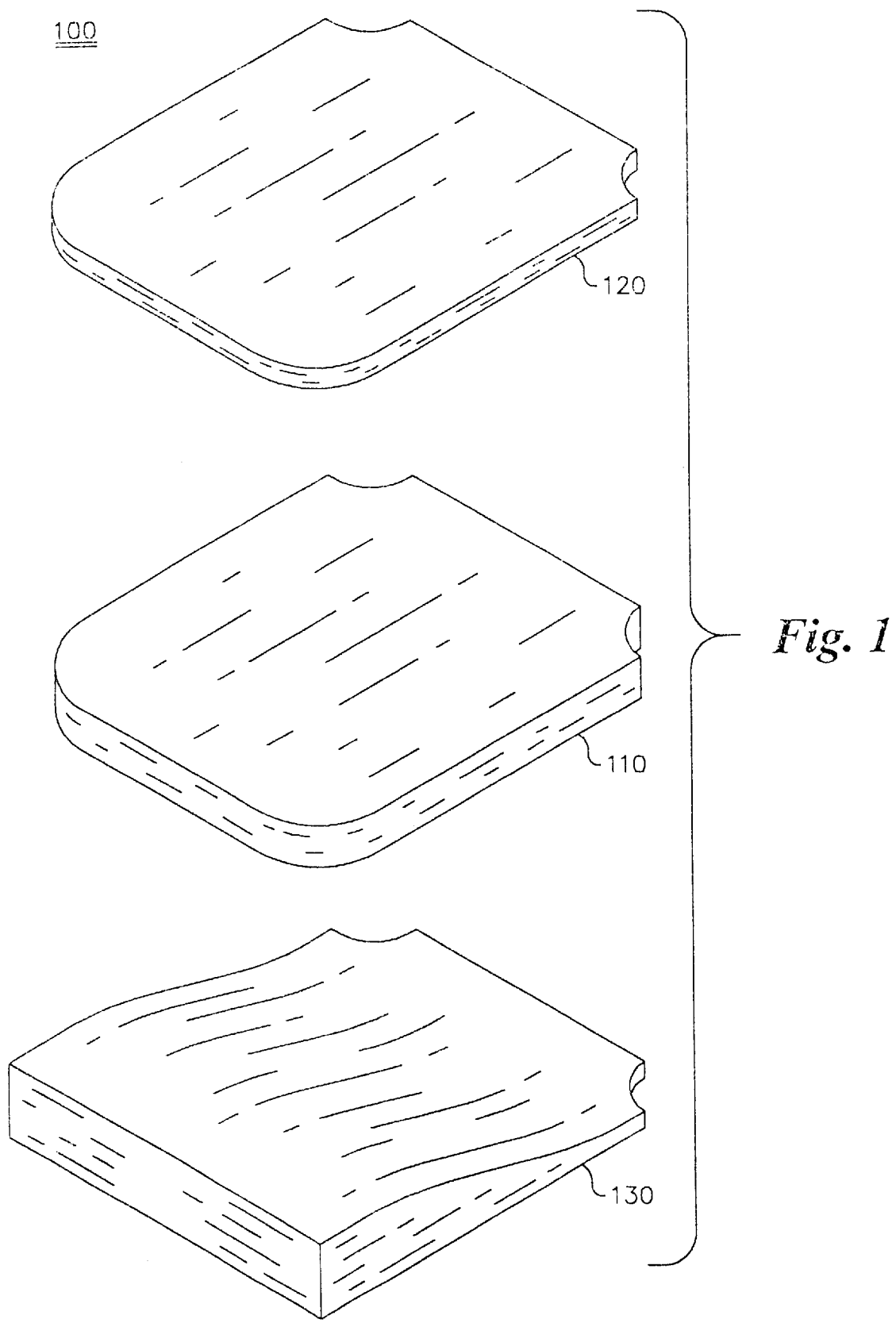
FIG. 1 is an exploded perspective view of the vehicle safety seat of the vehicle safety seat system of the present invention.
Figure 2:
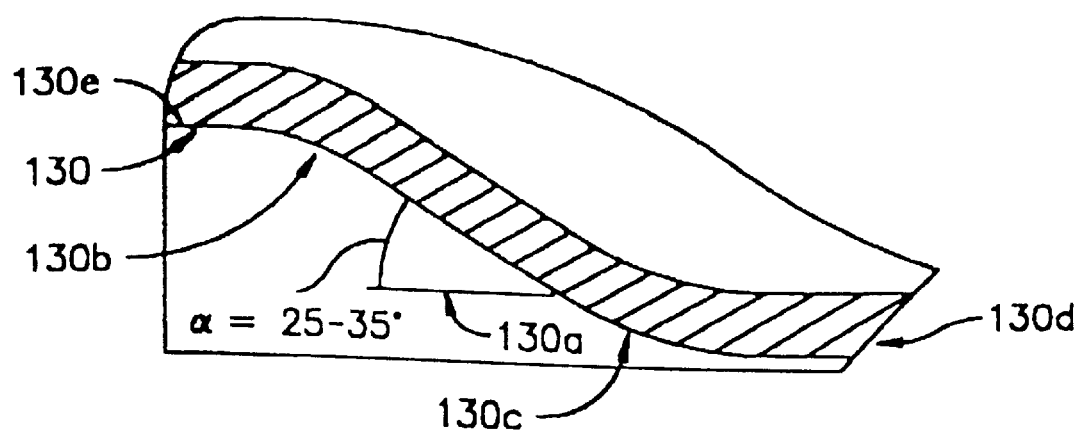
FIG. 2 is a side view of the angled metal seat bottom shown in FIG. 1.
Figure 3:
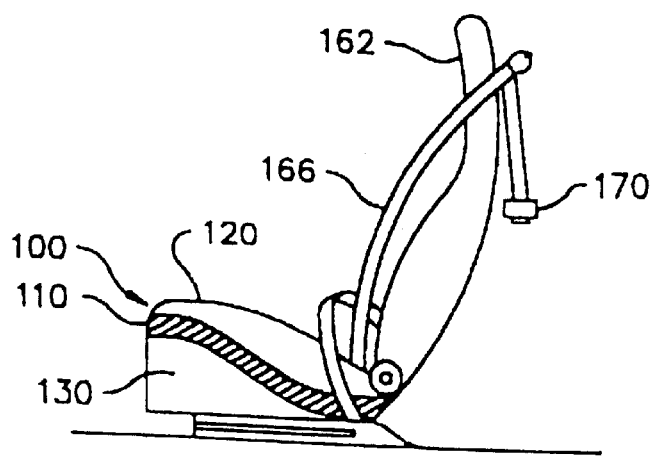
FIG. 3 is a side view of the vehicle safety seat of the vehicle safety seat system of the present invention.

Referring to the drawings, wherein the same reference numerals are used to designate the same elements throughout, there are shown in FIGS. 1 and 2 an exploded perspective view of the vehicle safety seat 100 and a side view of the angled metal seat bottom 130 of the present invention. The vehicle safety seat 100 includes a supporting angled vehicle seat bottom 130 formed of a structural material such as sheet metal. A foam layer 110 is disposed immediately above the metal seat bottom 130. Foam layer 110 is adapted to have a rate sensitive compression characteristic. The rate sensitive compression characteristic is such that it presents compressive response to a slow application of force and a rigid response to a rapid application of force such as the force applied to the foam layer 110 during an impact.

In the preferred embodiment, the seat bottom is ramped with ramp 130a in order to prevent the occupant from sliding forward during certain types of crashes. The angle of ramp 130a (shown in FIG. 2) is offset from the horizontal at an angle of twenty-five to thirty-five degrees or any other angle that prevents sub-marining of an occupant during a frontal impact. Additionally, the top portion of layer 130 may be inclined at ten degrees in the front region 130b and fifteen degrees in the rear region 130c of seat bottom 130. Forming the bottom layer 130 at these angles provides a further restraining function for restraining movement of the occupant of the vehicle safety seat system 150 during an impact. In a preferred embodiment where the front to rear dimension of seat bottom 130 is 18 inches, ramp 130a begins approximately 9 inches from the rear end (130d) of the seat bottom 130.

The foam layer 110 is disposed over the angled seat bottom 130 having ramp 130a in a manner which ensures that all loading of upward forces transmitted to the occupant of the vehicle safety seat 100 is done by way of the foam layer 110. Thus all portions of the top surface 130e of the supporting seat bottom 130 are preferably covered by the foam layer 110. When the safety seat 100 is combined with a seat back 162, the foam layer 110 also extends under the seat back 162. The thickness of the foam layer 110 may be approximately two inches.

Although any rate sensitive foam having the required compressive characteristic may be used to form the foam layer 110 of the vehicle safety seat 100, rate sensitive foams such as the conventional CONFOR™ foams are used in the preferred embodiment. These foams protect the occupant from vertical loading by reducing dynamic overshoot. They are open celled polyurethane foams having a rate sensitive property providing them with high energy absorbing properties. CONFOR™ foams and similar products exhibit low compression set for their low rebound, highly damped properties. This compression set permits loading up to and above fifty percent compression. Additionally, their low impact resilience provides good energy absorption. The energy absorption may be up to ninety-seven percent without bottoming out with little absorbed energy being returned to the impacting object.

When the foam layer 110 is formed of such a rate sensitive material it retains the shape of a depressing object when it returns to its original height if it is deformed slowly. Additionally, it softens when exposed to body temperature for a period of time. Both of these characteristics cause it to conform closely to the shape of the occupant of the vehicle safety seat system 150. This conformability allows the layer 110 to distribute weight of the occupant and transmit force of an impact more evenly.

It will be understood by those skilled in the art that the foam layer 110 may be formed of a foam having a variable modulus of elasticity. For example, the top foam layer 110 may be formed of a foam material wherein the variable modulus of elasticity is a dual modulus of elasticity.

A resilient comfort pad 120 is placed on top of the rate-dependent foam layer 110. A layer of upholstery (not shown) is then placed between the comfort pad 120 and the occupant in order to protect layer 120 from wear and to finish the packaging. Placement of comfort pad 120 between the occupant and the upholstery provides the present invention with the seat comfort level required by current automotive applications.

Figure 4:
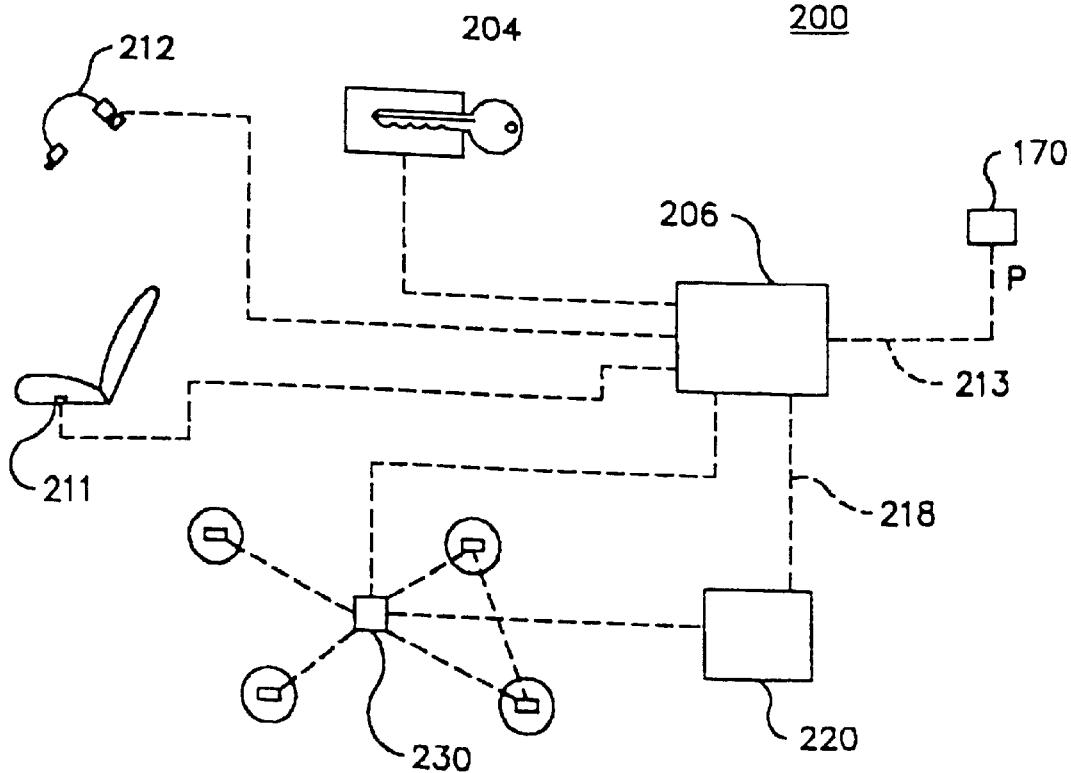
FIG. 4 is a block diagram representation of the control system function of the vehicle safety seat system of the present invention.

Referring to FIG. 4, there is shown a block diagram representation of the pretensioner control system 200 of the vehicle safety seat system 150 of the present invention. The pretensioner control system 200 includes the pretensioner device 170. The pretensioner device 170 is activated when a vehicle leaves the ground while in motion, thus indicating a potential vertical load or a rollover event. The pretensioner device 170 is a conventional pretensioner which is activated in response to a control signal applied to it by way of the control line 213. The control signal of the control line 213 is provided by the pretensioner system controller 206 in response to signals from the ignition switch 204, the seat occupied sensor 211, the belt buckle sensor 212, the rolling wheel sensors 230 and the suspension position sensor 220. The use of these signals is effective to prevent non-accident off-ground occurrences from activating the pretensioner device 170.

The suspension position sensor 220 requires both an arming event and a trigger event in order to apply an off-ground control signal to the pretensioner controller 206 by way of the control line 218. The arming event of the suspension position sensor 220 is the rolling of all four wheels of the vehicle containing the vehicle safety seat system 150. This event occurs during both a wheels-first crash and a roof-first crash. Rolling of the wheels of the vehicle is detected by the rolling wheel sensor 230. When the vehicle ignition 204 is on and the vehicle starts to move, the sensor 220 arms. This prevents inadvertent actuation in the event of jacking or lifting of the car. Thus, the vehicle must first be started and in motion for the pretensioner device 170 to be activated in a crash. The event required to trigger the sensor is the unloading of the vehicle by the wheels leaving the ground in any one of five possible combinations: Left front/right front; left rear/right rear; left front/left rear; right front/right rear; or all four wheels simultaneously leaving the ground.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A vehicle safety seat system for protecting an occupant of said vehicle safety seat system from injury, comprising:
  a ramped metal seat bottom having a ramp angle that prevents sub-marining of an occupant during a frontal collision;
  a first foam layer disposed immediately over said ramped metal seat bottom and supported by said ramped metal seat bottom, said first foam layer having a rate sensitive compression characteristic; and
  a second foam layer disposed over said first foam layer, said second foam layer having a characteristic that imparts comfort to the occupant during operation of the vehicle.

2. The vehicle safety seat system according to claim 1, wherein said rate sensitive compression characteristic comprises a compressive response to a slow application of force and a rigid response to a rapid application of force.

3. The vehicle safety seat system according to claim 1, further comprising an occupant restraint having a pretensioner device.

4. The vehicle safety seat system according to claim 3, including a vehicle off-ground sensor, wherein said pretensioner device is activated in accordance with said vehicle off-ground sensor.

5. The vehicle safety seat system according to claim 4, wherein said vehicle off-ground sensor comprises a rolling wheel sensor.

6. The vehicle safety seat system according to claim 5, wherein said vehicle off ground sensor comprises a suspension position sensor.

* * * * *